United States Patent [19]

Welygan et al.

[11] Patent Number: 5,011,642

[45] Date of Patent: Apr. 30, 1991

[54] METHOD OF MAKING EXTRUDED ARTICLE

[75] Inventors: Dennis G. Welygan; Ronald O. Zemke; Walter W. Pawlikowski, Jr., all of St. Paul, Minn.

[73] Assignee: Minnesota Mining and Manufacturing Company, St. Paul, Minn.

[21] Appl. No.: 434,583

[22] Filed: Nov. 13, 1989

Related U.S. Application Data

[60] Continuation of Ser. No. 210,745, Jun. 23, 1988, abandoned, which is a division of Ser. No. 58,565, Jun. 5, 1987, Pat. No. 4,828,902.

[51] Int. Cl.$^5$ .............................................. B29C 47/14
[52] U.S. Cl. ..................... 264/167; 264/171; 264/177.1; 264/177.16; 264/177.19; 425/465
[58] Field of Search ................. 264/167, 173, 177.1, 264/177.14, 210.8, 211.14, 177.16, 177.19, 171; 425/465–466, 387

[56] References Cited

U.S. PATENT DOCUMENTS

| | | | |
|---|---|---|---|
| 3,233,286 | 2/1966 | Batosti et al. | 264/167 |
| 3,655,855 | 4/1972 | Brumlik | 264/177.13 |
| 3,932,090 | 1/1976 | Brumlik | 425/466 |
| 4,056,593 | 11/1977 | Albareda | 264/167 |
| 4,211,525 | 7/1980 | Vetter | 425/465 |
| 4,631,162 | 12/1986 | Yoshimoto et al. | 425/465 |
| 4,634,485 | 1/1987 | Welygan et al. | 264/177.1 |

FOREIGN PATENT DOCUMENTS 52-07023  2/1977  Japan .................................. 264/167

*Primary Examiner*—Jeffery Thurlow
*Attorney, Agent, or Firm*—Gary L. Griswold; Walter N. Kirn; Andrew D. Sorensen

[57] ABSTRACT

An extruded article is provided having a base element, and rib element attached to the base element along its entire length. The rib element is narrower at its attachment end than at its free end, and is undulated. The article is formed by extruding an extrudable plastic mass having a conformable state and a nonconformable state. The extrusion rate of the free end of the rib element is sufficiently faster than that of the base element causing the free end of the rib element to undulate without distortion as the structure is extruded. The plastic mass is then converted to the nonconformable state while maintaining the undulation in the free end of the rib element.

8 Claims, 5 Drawing Sheets

METHOD OF MAKING EXTRUDED ARTICLE

This is a continuation of application Ser. No. 07/210,745, filed June 23, 1988, now abandoned, which is a division of application Ser. No. 07/058,565, filed June 5, 1987, now U.S. Pat. No. 4,828,902.

TECHNICAL FIELD

The present invention relates to an extruded article having a non-uniform undulating rib structure on one or both sides of the article and a process for extrusion of the article by a direct extrusion process with an extrusion die having no mechanical moving or reciprocating parts.

BACKGROUND ART

Various three dimensional plastic networks find utility in a wide variety of applications. For example, a three-dimensional web which may be formed of crimped staple fibers adhered together at points of contact or of extruded, autogenously bonded, continuous filaments. The webs may be employed as the structural element of a non-woven abrasive pad or article. Additionally, the same fiber or filament structures and other three-dimensional open plastic networks such as reticulated foams may be employed as filters, mats for cushioning, wiping, or any of a wide variety of other uses.

Various methods of making three-dimensional structures of various materials such as plastics are known in the art. U.S. Pat. No. 4,332,757 (Blackmon), discloses the preparation of a textured continuous filament yarn made by combining molten streams of polymer in a side-by-side configuration with one stream at a higher speed than the other to create a yarn with a false twist.

U.S. Pat. No. 4,384,022 (Fowler), assigned to the assignee of the present application, discloses a filamentary structure comprising a thermoplastic core filament extending in successive turns of spiral and thermoplastic sheath filaments which extent linearly generally in the direction of the axis along the outside of the spiral. The structure formed by this disclosure, however, cannot include a core filament having an aspect ratio much greater than one in order to maintain the spiral.

U.S. Pat. No. 3,178,328 (Tittmann) discloses a process and apparatus for producing a plastic net utilizing a die having an oscillating portion to extrude linear filaments, together with oscillating filaments to create a sine wave in the oscillating filaments, thereby creating a net-like structure. Tittmann's disclosure fails to indicate that anything other than a flat plastic net may be produced.

U.S. Pat. No. 3,193,604 (Mercer) teaches the ability to form an extruded sheet having ribs on both sides of the sheet by using a reciprocating or rotating extrusion die. The ribs on any given side may intersect or join each other depending on the rib spacing and the amplitude of the rib oscillation.

U.S. Pat. No. 4,233,259 (Pietratus) teaches the method of extrusion of a single inverted "T" (cross section) element or strand of which the upward leg undulates to form an untapered "wavy fin". The undulation is caused by having a shorter length of the approach surface leading to the fin profile opening in the die than that leading to the base opening. This causes areas of higher flow velocity which in turn results in an increased supply of the material to be extruded to these regions of the profile openings. The patent also teaches the need for a guide plate near the orifice exit to control width and/or change the direction of the fin folding.

U.S. Pat. No. 4,419,315 (Kessler) teaches the extrusion of a weatherstrip comprising a plurality of thin untapered flexible ribs in a wavy pattern that is attached to a backing strip from the same extrusion process. Straight and sinusoidal rib combinations are also disclosed. Kessler's disclosure fails to reveal ribs with non-uniform cross-sectional profiles.

U.S. Pat. No. 4,631,215 (Welygan), assigned to the assignee of the present application, discloses an extruded article comprising a plurality of linear spaced parallel extruded filaments separated by a regularly folded undulated extruded element having an aspect ratio of at least about two. The undulations have opposed apexes on either side thereof with apexes on one side of the undulated elements being bonded initially without adhesive to one of the parallel extruded elements and the apexes on the other side of the undulated element being bonded to the other parallel extruded element.

DISCLOSURE OF THE INVENTION

The present invention provides a unique extruded article having a base element and at least one undulating tapered rib element. The rib element is attached to the base element along its entire length. The article may have multiple tapered rib elements and may also have secondary structures, i.e., nontapered rib elements interspersed therewith.

More particularly, the extruded article of the present invention comprises an elongate base element, and at least one elongate rib element having an attachment end and a free end, the attachment end being attached to the said base element along its entire length and the rib element being narrower at its attachment end than at its free end. The rib is the same length as the base element at its attachment end, being longer and undulated at its free end.

The invention is not limited to articles having planar base elements but may comprise articles with base elements having a corrugated appearance or circular or tubular cross-sections. The ribs may be separated from each other or they may touch each other. It is possible to mix ribs having different amplitudes and/or different frequencies of undulation and different heights. The ribs may be interspersed with extruded straight elements or other profiles in any combination. These straight elements may also be attached to the base element but this is not a requirement.

The article is formed by the following steps: (a) extruding an extrudable plastic mass having a conformable state and a cured state to form an elongate extruded structure having a base element and at least one elongate rib element having an attachment end and a free end, with the attachment end being in contact with the base element along its entire length. The rib element is narrower at the attachment end than at the free end; the extrusion rate of the base element and the attachment end of the rib element is the same but is sufficiently slower than the extrusion rate of the free end of the rib element so that the free end of the rib element will undulate as the structure is extruded. The free end of the rib element is permitted to undulate without distortion of the base element while the plastic mass is in the conformable state. The plastic mass is then converted to the cured state while maintaining the undulation in the free end of the rib element.

As used herein, the term "extrudable plastic mass" refers to a substance having a viscosity which permits it to be extruded as a filament, ribbon, film or the like from an extrusion orifice and, upon extrusion, will have sufficient cohesiveness to maintain its extruded shape for a finite period of time to permit subsequent process steps.

The current invention is not restricted to thermoplastic materials. Any organic or inorganic material possessing viscoelastic characteristics can be used; this includes materials wherein such characteristics are present in an intermediate stage. Such materials need only maintain the extruded shape long enough to permit any necessary subsequent process steps such as drying, firing, freezing or hot oil setting.

Examples of substances which will provide a filament-forming extrudable plastic mass for use in the present invention include:

(a) Synthetic thermoplastic resins capable of melt extrusion or compression extrusion in a molten state through dies and settable on cooling after extrusion. Readily obtainable suitable thermoplastic materials include polyamides or super polyamides (e.g., nylon), polyesters, polyurethanes, vinyl polymers (e.g., vinyl acetate polymers), vinyl chloride polymers, polyvinyl chloride and copolymers thereof with other ethylenically unsaturated monomers such as vinyl acetate, vinylidene chloride, and like monomers, polyethylene, polypropylene, and thermoplastic rubbers, and the like, polyolefin polymers, and polystyrene;

(b) Natural and synthetic rubbers, subsequently vulcanized or containing vulcanizing agents;

(c) Thermosetting plastic materials or mixtures thereof with thermoplastic materials, which are capable of extrusion in a liquid or semi-liquid state;

(d) Natural and synthetic fiber-forming materials extruded from solvent solution, such as cellulose or protein material, cellulose acetate, acrylate polymers, as well as many thermoplastic resins as mentioned above, dissolved or dispersed in a solvent and capable of extrusion and setting by drying (e.g. by solvent evaporation), immersion in or spraying with a coagulant as the plastic mass emerges from the dies;

(e) Blends such as masses which may include pulverized slurried foodstuffs, dissolved or molten foodstuffs such as sugar-based mixtures which on setting form solid or resilient candy;

(f) Foamable compositions containing any of the above materials; and (g) Any other plastic masses which may be extruded through a die to form filaments.

BRIEF DESCRIPTION OF THE DRAWINGS

The invention may be more clearly understood by reference to the drawings, wherein:

FIGS. 8–23 depict cross-sectional views of exemplary alternative extruded articles made in accordance with the invention.

DETAILED DESCRIPTION OF THE INVENTION

Figure 1:
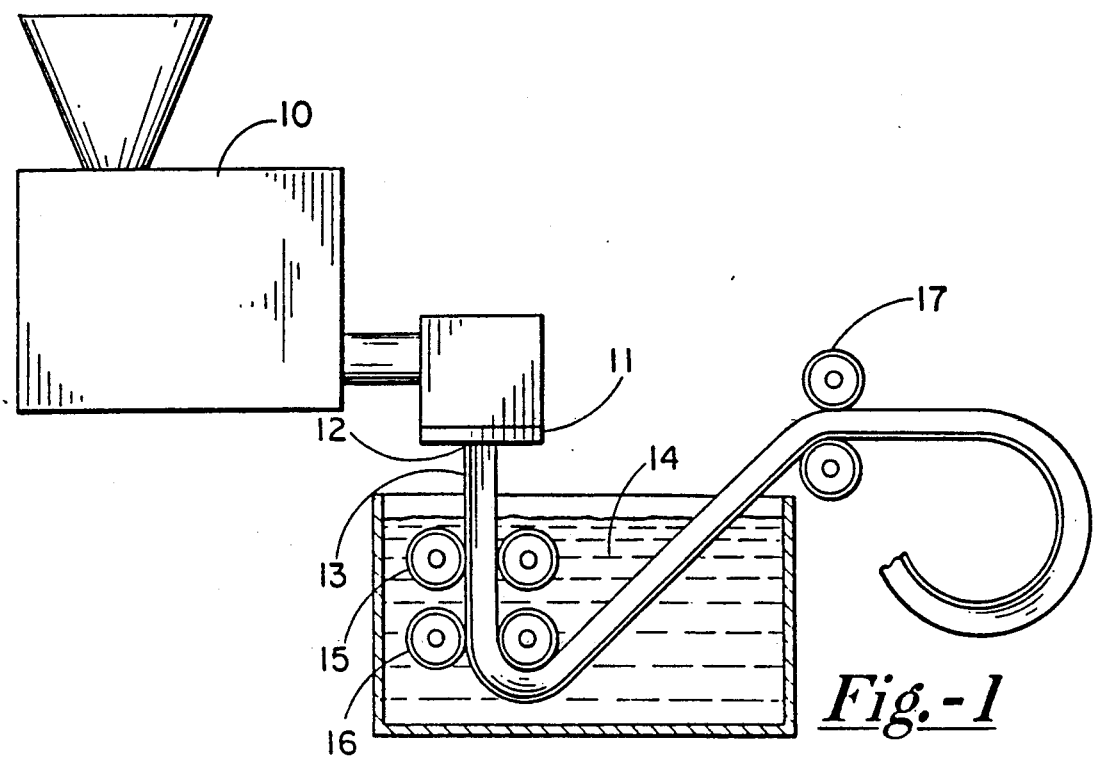
FIG. 1 is a side elevational view of an extrusion apparatus for carrying out the method of the present invention located over a tank of cooling medium and having associated therewith apparatus for removal of the extruded web from the cooling medium.
Figure 2:
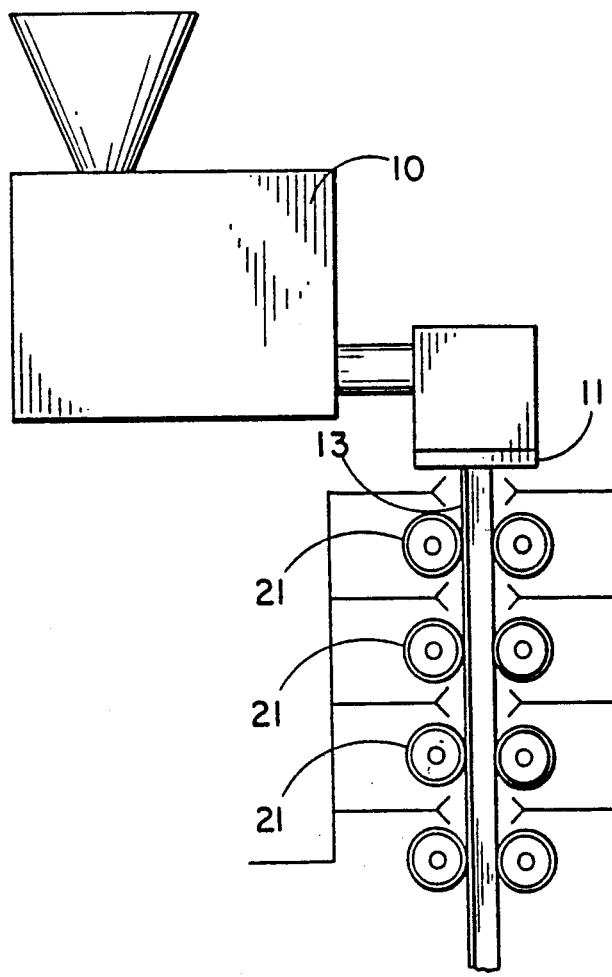
FIGS. 2 and 3 are side elevation views of alternative extrusion apparatus for practicing the method of the invention.
Figure 3:
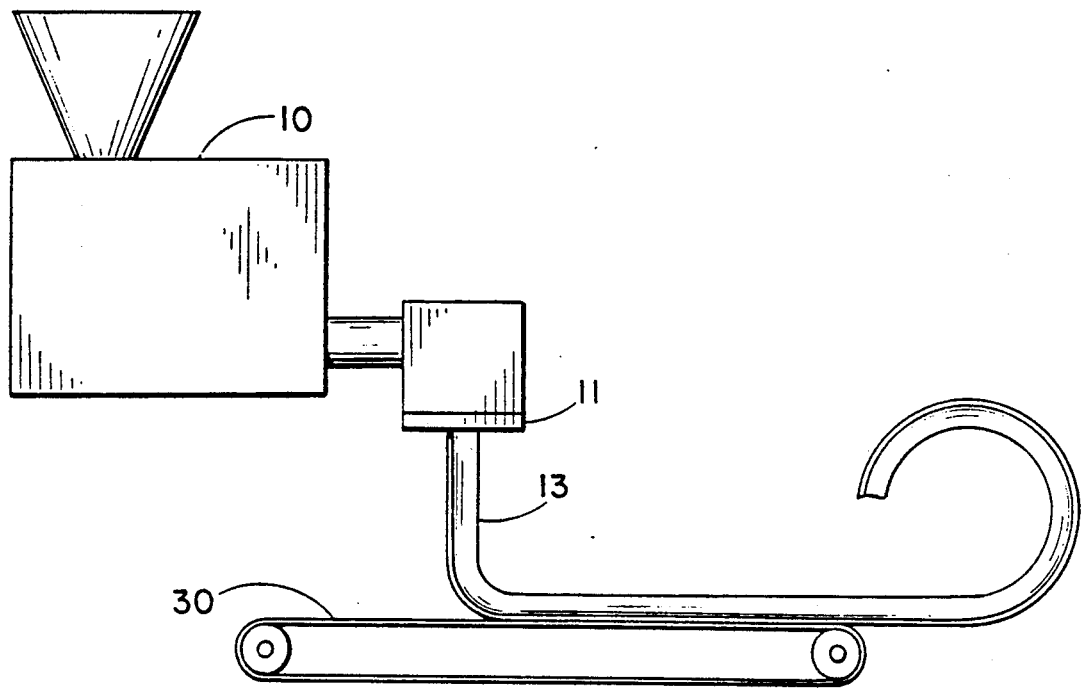

As shown in FIG. 1, an extrudable plastic mass is extruded by extruder 10 (where the extruded substance may be rendered plastic) from extruder die 11 which has the appropriate extruder surfaces 12 to form a substantially continuous extruded web 13. Various methods of handling web 13 are possible as depicted in FIGS. 1, 2 and 3. As shown in FIG. 1, the extruded web may be formed into quench bath 14 containing a suitable quench medium such as water and guided therein by idler roll sets 15 and 16 and removed therefrom by passing between idler roll set 17 after which it could be wound for storage or incorporated into a product.

As shown in FIG. 2, it is also possible to maintain the extruded web in a straight configuration employing an air or water spray quench chamber fitted with appropriate idler roll sets 21. Furthermore, as depicted in FIG. 3, the extruded web may be deposited onto a continuous cooling belt 10 which is preferably porous to provide dissipation of heat and passage of forced air, if desired.

Figure 4:
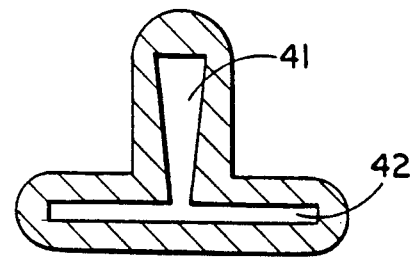
FIG. 4 is a representative of the opening of an extrusion die of the type useful for preparing the article of the present invention and practicing the method of the current invention.

FIG. 4 depicts a typical extruder die configuration having an opening capable of extruding the simplest extruded article of the present invention; a single rib element 41 attached to a planar base element 42.

Various modifications of the extruded structures obtained by the present invention depend substantially on the extrusion slot dimensions, i.e., the width of the rib element.

Figure 4A:
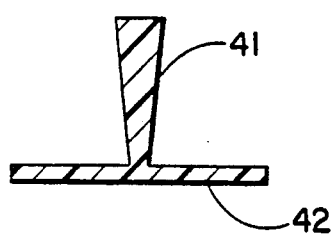

FIG. 4A depicts a cross-sectional view of an article extruded by the die of FIG. 4 consisting of a single rib element 41 attached to a planar base element 42.

Figure 5:
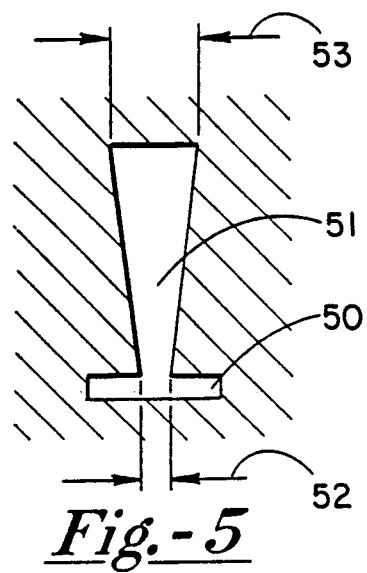
FIGS. 5 and 6 are representations of die designs for making specific articles of the invention.

FIG. 5 depicts a similar die. The width (cross-web) of the base element 50 has two effects on the article; damping and attachment. The width should be selected such that it provides enough mechanical damping so that the force of the extruded rib to bend into the plane of the backing will not cause the entire structure to end away; rather the rib will deflect. It is also possible to temporarily apply a retarding surface to the back of the base element (moving belt or rotating cylinder) to minimize the mass effect of this damping such that the base may be substantially thinner than the attached ribs. The second effect of the base width is to provide a point of attachment which moves at a slower velocity than the free end of the rib which is the faster moving portion. It is this differential of velocity, in combination with the backing inertia that causes the rib to undulate.

The velocity differential may be achieved by a variety of methods, the simplest of which is a specially designed die having an appropriate profile. A simple profile which is easy to fabricate is a uniformly tapered slot as in FIG. 5 where 52 is the width of the rib orifice ($W_b$) at the point where the tapered slot communicates with the second slot to form the point of attachment, and 53 is the width of the rib orifice at the point on the tapered slot which forms the free end of the rib ($W_t$). Although the taper of the rib element shown is a simple linear taper, it may also be a more complex shape, e.g. a parabolic or other variable curvature as long as it produces a rib wherein the area at the free end of the rib is greater than that at the attached end. A die which causes a minimal velocity distribution would produce an extruded rib having little tendency to undulate. Such a rib would extrude simply as a straight rib while a higher velocity distribution die will form a rib which undulates easily. This phenomenon can be characterized by considering the ratio of $W_t$ to $W_b$, where a ratio of 1 reflects no tendency to undulate, and a ratio of greater than 1 reflects a tendency to undulate. Larger ratios will yield larger undulation amplitudes when base thickness is held constant.

Table I shows the effect of various $W_t/W_b$ ratios on rib amplitude for a polyvinyl chloride structure where the rib height and base thickness are held constant:

TABLE I

Material: polyvinylchloride
Temperature: 155° C.
Rib Height: 0.559 mm.
Base thickness: 0.45 mm.

| $W_t/W_b$ | $W_t$ (mm) | Rib Amplitude (mm) |
|---|---|---|
| 1.00 | 0.45 | 0.45* |
| 1.11 | 0.50 | 0.51* |
| 1.30 | 0.59 | 2.54 |
| 1.44 | 0.66 | 3.43 |
| 1.66 | 0.76 | 4.57 |
| 2.00 | 0.91 | 4.95 |
| 2.77 | 1.97 | 5.97 |
| 4.00 | 1.83 | 5.59 |

*no undulation; figure reflects thickness of ribs only.

When the $W_t/W_b$ ratio is small, i e., 1.0 to 1.1, the profile essentially extrudes statically with no tendency for undulation. Once the ratio exceeds 1.1, in this case 1.3, the dynamic phenomenon of undulation occurs with increasing $W_t/W_b$ ratio influencing the amplitude of the undulation.

Figure 6:
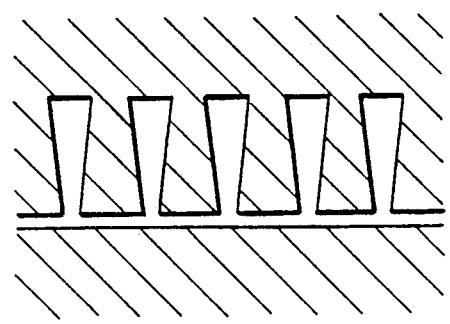

FIG. 6 depicts a die opening for an article comprising multiple identical rib elements attached to a planar base element.

The rib heights can also be varied and interspersed in any order. The effect of rib heights will also affect the frequency of undulation if a constant taper angle is considered. This is a result of the differential flow rate that can be achieved by either a tall rib or a short rib. The shorter rib will result in less differential flow relative to the base element if there is no compensating change in taper angle.

The data in Table II illustrates that there is also a minimum rib height required for undulation to occur with a constant taper angle.

TABLE II

Material: Polyvinylchoride
Temperature: 155° C.
Base element thickness: 0.46 mm.
Taper angle: 4.2°

| Rib Height (H,mm) | $W_t$ (mm) | Amplitude (mm) | $H/W_b$ | $W_t/W_b$ |
|---|---|---|---|---|
| 0.91 | 0.589 | 0.50* | 2.0 | 1.28 |
| 1.97 | 0.655 | 1.27** | 3.0 | 1.43 |
| 1.83 | 0.721 | 2.79 | 4.0 | 1.57 |
| 2.74 | 0.859 | 4.44 | 6.0 | 1.87 |
| 4.57 | 1.123 | 4.95 | 10.0 | 2.45 |
| 5.58 | 1.270 | 5.97 | 12.2 | 2.77 |

*no tendency for undulation; figure reflects thickness of rib only
**very slight undulation Minimal undulation will occur when the rib height is less than 3 times the base element thickness.

When the rib height ratio ($H/W_b$) is low; i.e., twice the thickness of the backing ($H/W_b=2.0$) or less, the profile essentially extrudes statically with no tendency for undulation. When the rib height ratio is increased to 3 times the width of the backing, a very slight tendency for undulation is observed. When the rib height ratio exceeds 3.0, undulation occurs. Increasing height (and corresponding $W_t/W_b$ increases) continues to influence the amplitude of the undulation.

Figure 7:
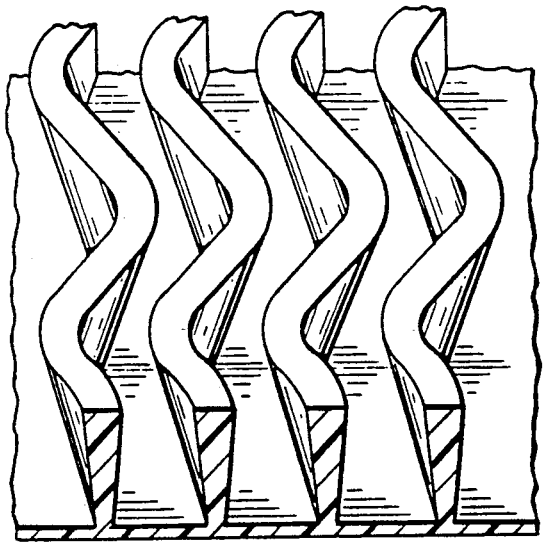
FIG. 7 is a top plan view of an extruded article made in accordance with the present invention by employing a die of the design type pictured in FIG. 6.

FIG. 7 is a top plan view of the end section of an article produced by a die of the design of FIG. 6.

Figure 8:
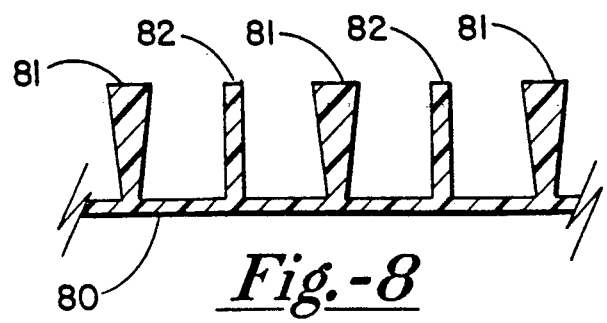

FIG. 8 depicts a cross-sectional view of an article of the invention with a planar base element 80 and multiple undulating ribs 81 having the characteristic non-uniform profile of the invention and multiple secondary ribs 82 having uniform profiles interspersed therebetween.

Figure 9:
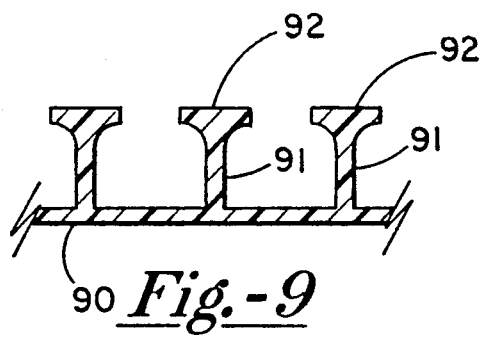

FIG. 9 depicts a cross-sectional view of an extruded article of the invention, made by the process of the invention wherein the article has a planar base element 90 and multiple undulating ribs 91. These ribs have an area of increased taper 92 at the distal end of the rib element from the base element.

Figure 10:
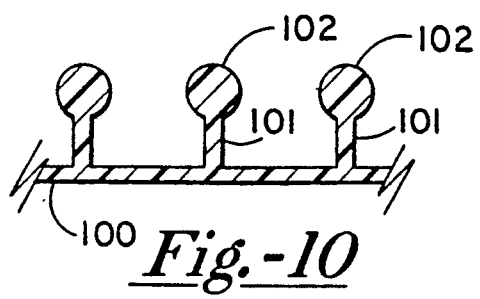

FIG. 10 depicts a cross-sectional view of an extruded article having a planar base element 100 and multiple ribs 101 attached thereto, wherein the ribs have a circular shape 102 at the free end of the rib caused by a circular opening in the rib forming element of the die distal to the base element forming portion.

Figure 11:
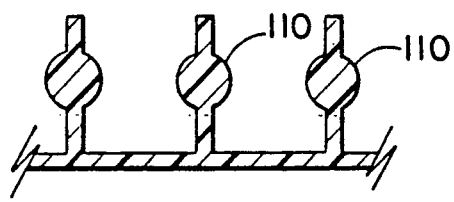

FIG. 11 depicts a cross-sectional view of an article which also employs a circular shape on its ribs 110, however, it is positioned at the midpoint of the ribs rather than at its free end.

Figure 12:
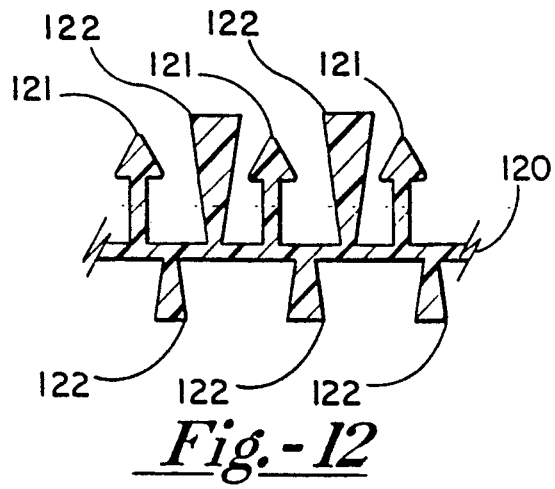

FIG. 12 shows a cross-sectional view of an extruded article of the invention, having undulating ribs with a triangular or "arrowhead" shape at the free end 121 and secondary characteristic tapered ribs 122 on both surfaces of the base element 120. This configuration provides greater surface area at the rib's free end if needed, e.g., if bonding of the free end of the ribs to another set of ribs is desired. This article may be formed by specific die design wherein the die has a triangular shaped opening in the rib forming element distal to the base element. Various shapes may be created as desired.

Figure 13:
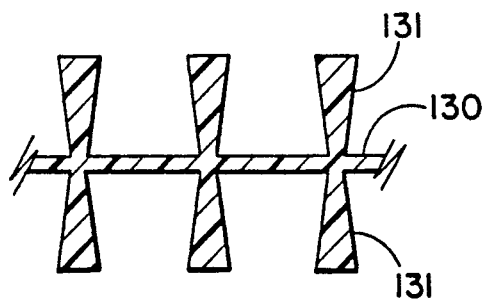

FIG. 13 depicts an extruded article of the invention with a planar base element 130 which has multiple rib elements 131 attached to each of its two opposite surfaces.

Figure 14:
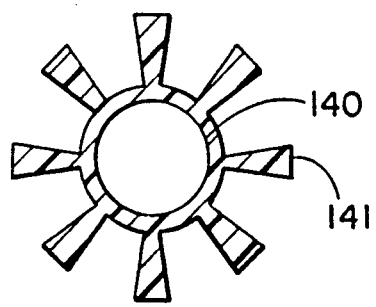

FIG. 14 depicts the cross-section of an extruded article of the invention wherein the base element 140 is non-planar having a circular profile with attached undulating rib elements 141.

Figure 15:
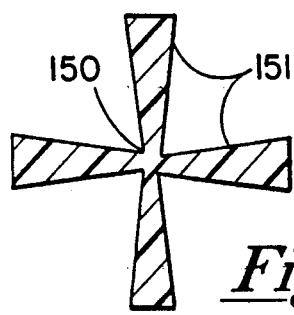

FIG. 15 depicts a cross-sectional view of an extruded article of the invention wherein the base element is a single point 150 having multiple tapering rib elements 151 attached thereto.

Figure 16:
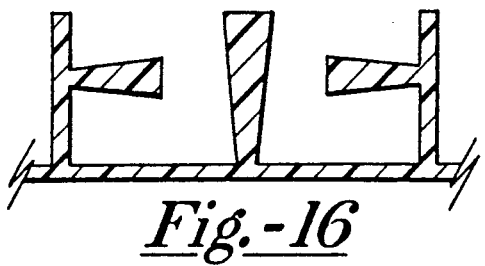
Figure 17:
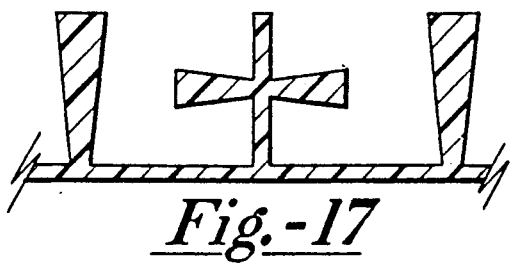
Figure 18:
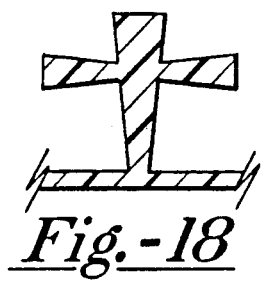

FIG. 16 through FIG. 18 depict cross-sectional views of extruded articles of the invention with planar base elements having multiple attached ribs, the rib elements having one or more secondary ribs attached thereto wherein the secondary ribs have an attachment end and a free end, the attachment end being narrower than the free end, and attached to the rib element along its entire length.

Figure 19:
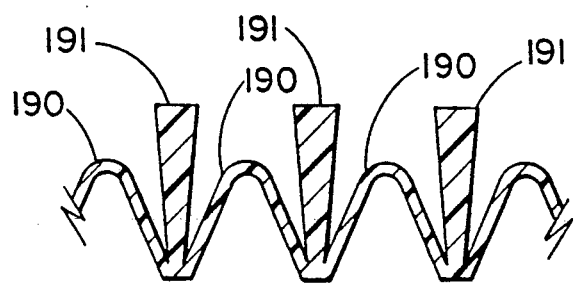

FIG. 19 depicts the cross-section of an extruded article of the invention having a base element with a non-planar surface 190 with multiple attached undulating ribs 191. The non-planar surface improves integrity of the attachment of the rib to the base element by providing additional reinforcement at the attachment end of the rib where it is thinnest. This becomes particularly important where an article including this type of structure is subjected to repeated flexing, e.g., if it were used as a floor mat. The contours of the non-planar base element also help ensure uniformity of rib amplitude by providing a restraining element near the base of the undulation so that the free end of the ribs will not overly undulate or create irregularities in amplitude.

Figure 20:
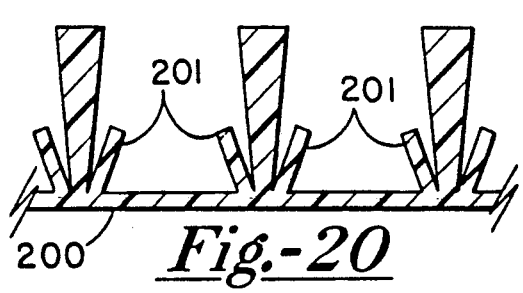

FIG. 20 uses both a planar base element 200 and a base element with a non-planar surface 201, to combine the advantages of a base element with a non-planar type surface with the convenience of a planar base element.

Figure 21:
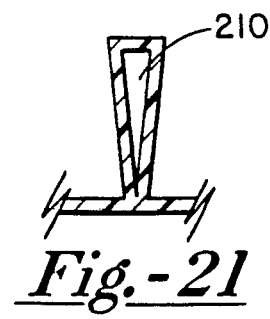

FIG. 21 depicts a cross-section of an extruded article of the invention wherein the rib element has a hollow core 210. This variation can be created by specific die design.

Figure 22:
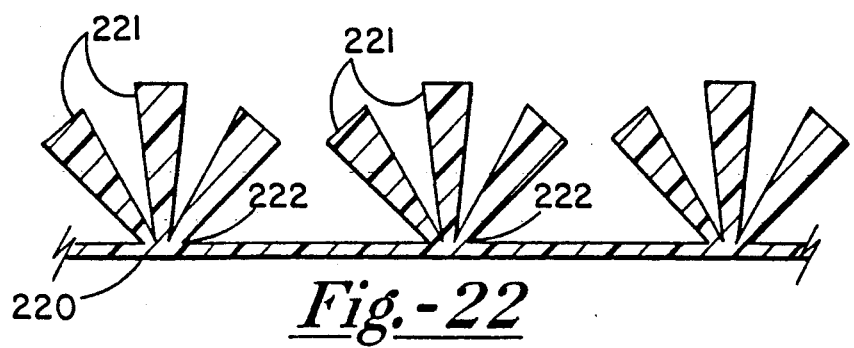

FIG. 22 depicts a cross-section of an extruded article of the invention with a planar base element 221 having multiple groups of undulating rib elements 221 with a common point of attachment 222 to the base element.

Almost any thermoplastic material may be utilized to form the extruded article of the present invention. Useful thermoplastic materials include polyolefins, polyamides, thermoplastic polyurethane, polyesters, thermoplastic rubbers, polyvinyl chloride, polysulfone, polyimides, polycarbonates and acrylics. Low melt viscosity materials may be utilized to prepare extruded articles including a relatively small amplitude undulation in the rib element but such materials would generally be undesirable for making articles with very large amplitude undulation in the rib element. In general, a higher melt viscosity thermoplastic material tends to be more amenable to a wide variety of size ranges.

It is also possible to control the melt viscosity of the thermoplastic materials by control of the extrusion temperature. Typically, the extrusion temperatures are selected toward the lower limits of the processing temperature range of the polymer. Too high a temperature may restrict the polymer's utility to smaller size extruded structures. Blends of materials and material compounding offer other alternative to controlling the melt strength. Extremely high melt viscosities may cause excessive die swell of the extrudate, i.e., expansion of the extruded element upon exiting the die, and, therefore, may limit their use to structures of large diameters.

As previously mentioned, the filament forming extrudable plastic mass is not restricted to thermoplastic materials, although they are preferred. Useful extrudable materials also include extrudable food compositions (i.e., pasta, candy formulations, cereal compositions and the like), dissolved cellulose slurry, and other extrudable masses.

The extruded article, after extrusion, is converted by a suitable technique to a state where elements no longer bond to one another, hereinafter called the cured state. Such techniques, besides cooling or freezing, could involve drying, infrared or hot oil setting, radio frequency (RF) or microwave drying, and the like. Heat setting or curing of a thermosetting resin such as a thermosetting polyurethane will provide one means of converting or changing the plastic mass to the state where elements no longer bond to one another. The process may also be utilized to extrude articles from inorganic extrudable masses such as those utilized for the formation of ceramic materials. Such articles would, of course, require drying and firing.

The dies useful in the preparation of the extruded articles of the present invention are relatively simple, merely having the appropriate orifices prepared by machining or drilling.

The preferred range of die size for the current invention consists of rib heights varying from about 1.25 mm to about 26.0 mm. The rib width can vary from about 0.25 mm to about 6.50 mm. The preferred $W_t/W_b$ ratio is from 1.5 to 3.5 although this ratio is very dependent on the end article configuration. The rib spacing can vary from 0.75 mm (the lower limit is that point where a rib can be formed which does not touch its nearest neighbor during extrusion but allows a minimum of undulation of about 12.5 mm. The dies can be fabricated using standard engineering practices with a die length to diameter ratio (L/D ratio) in the 5 to 10 range. A lower L/D ratio causes increased die swell in the product which is not desirable. FIG. 4 illustrates a typical die configuration with a streamlined entrance region to minimize flow deadspots.

Die width can vary from a single element to over 1.5 meters. The die may also include retraining ribs to improve rib uniformity and reinforcement.

Shear rate can have a significant effect on oscillation amplitude if the materials are shear sensitive. In general, as the shear rate is increased, localized shear heating occurs and the material oehaves as though it has a lower bending modulus. This causes lower amplitude undulation. This may be partially offset by reducing die temperatures.

Extrusion temperature can range from 130° C. for certain grades of polyvinyl chloride and polyethylene copolymers to over 270° C. for higher temperature materials such as nylon and high molecular weight polyethylene. Care must be taken to remain above the crystallization point of crystalline materials, especially if they are of the lower melt viscosity. Although horizontal collection techniques are possible, this technique is dependent upon melt strength. If the polymer melt strength is low, then the structure may collapse upon itself immediately upon exiting the die. In this case, vertical collection into a rapid quenching system is necessary.

The collection and quenching system is quite important in the control and production of the wavy rib structure as described herein. The choice of collection technique is partially determined by the material to be extruded. If the melt possesses a low viscosity or poor melt strength, then a rapid quench into water may be needed. If the melt possesses a high viscosity or high melt strength, horizontal extrusion onto a moving belt carrier with either type of cooling would be adequate. FIGS. 2 and 3 illustrate two of the more easily achieved quenching techniques. To prevent excessive drawdown under the extrudate weight and also to ensure uniform undulation and amplitude, the quench medium should be located relatively close to the die face. The actual distance is dependent upon the size and amplitude of the undulating rib element. The small sizes are preferably collected very close to the die face, e.g., approximately 13 mm–25.5 mm, while the large sizes can be quenched further from the die face, e.g., approximately 25.5–75.5 mm. Enhanced bonding between the undulating rib and any secondary straight rib parallel to and in contact with the undulating rib is improved if the quench distance is maximized, although this may be difficult if the melt strength is poor.

The final dimensions of the extrudate may also be affected by the collection technique. If the extrudate is pulled away too rapidly (more rapidly than its natural extrusion rate determined by extruder conditions) its dimensions will generally decrease in proportion and the extrudate is said to be "drawn". Some drawing may be desirable, for special effects, but excessive drawing which may straighten the rib and eliminate the undulation should be avoided. Such drawing could reduce the dimension of both the base element and the rib element from that obtained by extrusion. For this reason, to characterize the amplitude, it is necessary to discuss the conditions under which the extrudate is collected. The maximum amplitude that may be achieved with the process of the present invention is that amplitude in which the extrudate is collected under the slowest collection rate or the rate which matches the natural extrusion rate of the extrudate determined by extruder conditions. This rate yields an article having ribs with the maximum amplitude permitted by any given die configuration. If the collection rate is slower than this rate, overall buckling of the extrudate may occur which may be undesirable. Hence, it is possible to obtain a maximum amplitude of undulation with any given die configuration. As the collection rate is increased, articles having ribs with continually diminishing amplitudes are produced as the extrudate is drawn.

The cooling structure must be pulled away uniformly to prevent pulsations in appearance. This is best done by a pair of nip rolls having smooth surfaces and gapped to provide a slight compression so as to pinch the structure but not deform the web unduly.

A dual nip set system is particularly preferred when the extrudate material is less flexible than a plasticized polyvinyl chloride. In this situation the upper set of nip rolls are "gapped" to provide a guiding function without a positive drive since they must be positioned quite close to the die face and yet be under the quench media (typically water) when the extruded material is at its softest state and the lower set of nip rolls are driven to provide a positive pulling influence on a completely quenched structure at a point where it is no longer deformable.

In the case of very rigid structures, typically having large dimensions (polypropylene or nylon for example), a vertical collection system of the type pictured in FIG. 3 may be necessary since bending or rolling up of the extrudate would be difficult. This collection device consists of multiple pairs of nip rolls, appropriately gapped at various locations with water sprays to quench the extrudate. A sheeting process may be used to cut the structure to convenient and variable lengths since it may not be easily rolled without damage.

The present invention may be modified by a number of secondary operations that may enhance the extrudate. Some examples of useful secondary operations include the following.

(a) Lamination of the extrudate. Contacting a secondary material in sheet form with the uncured freshly extruded article produces a composite article. The secondary material could be an adhesive sheet, a polymer film with differing properties or an anti-slip material.

(b) Coextrusion of the article.

The coextrusion technique allows a variation in the method by which differential flow can be achieved, that is by separating the flow between the rib and the base element and separately controlling the flow rate to each. It is possible to mix materials to provide ribs of a flexible material and a base element of a rigid material. The variation in material selection may be related to color enhancement, property enhancement, or cost benefits.

(c) Embossing of the extrudate is another way of providing a change in the surface appearance of the article. Embossing a pattern or an edge can change the physical appearance of the structure, e.g., by adding an edge to the mat structure.

(d) Coating of the extrudate by any of various known techniques (roll coating, spray coating, dip coating, etc.), the inclusion of other articles (carpet strips, flock, abrasive, anti-slip particles, etc.), and curing of the composite may also be employed to change the appearance and/or function of the article.

(e) Incorporation of chemical blowing agents (e.g., azoisocarbonamide) may be used to foam the article with cellular voids to give added resiliency and/or weight reduction.

Many possible applications exist for this rib structure. The size of the web selected and the type of material utilized will vary with the application desired. Material selection determines whether a rigid structure or a flexible, rubbery web can be made. The size of the structure, i.e., rib dimensions and rib spacing influence the appearance, basic weight, and physical properties of the resultant web. The integral rib attached to a base element is especially useful as no additional binding agent is necessary. Possible applications include: a wide variety of matting materials, a geotextile component to promote drainage (either alone or in combination with other nonwovens), a media structure for heat or mass transfer, a substrate for an abrasive fiber or other abrasive article, a spacer material in general, a light or material diffuser, a structural or reinforcing member, a static mixing element, a handpad or cleaning device, a packing or energy absorbing material, and many decorative items.

EXAMPLES

The following examples are meant to be illustrative, and should not be construed as limiting the scope of the invention.

EXAMPLE 1

Polyvinylchloride pellets (Shore A75 hardness) with a melt index of 7 (as measured by ASTM 1238 condition E) were melt extruded to produce an article having a structure like that of FIG. 12 undulating by using an extrusion die having the following configuration:

|  |  |
| --- | --- |
| Major rib width | 1.27 mm |
| Major rib height | 5.59 mm |
| Major rib spacing | 6.35 mm |
| Major rib base | 0.46 mm |
| Minor rib width | 0.76 mm |
| Minor rib height | 2.03 mm |
| Minor rib spacing | 6.35 mm |
| Minor rib base | 0.30 mm |
| Backing slot | 0.46 mm |
| Static rib width | 0.46 mm |
| Static rib height | 5.59 mm |
| No. of major ribs | 11 |
| No. of minor ribs | 11 |
| No. of ribs | 12 |

Extrusion temperatures were in the 150° C. to 165° C. range. The resulting web was quenched in a water bath at 24.4 mm/second. The basic weight was 2.9 kg/sq. meter. The water level was approximately 25.4 mm from the face of the die. A 30 mm extruder was used.

EXAMPLE 2

Plasticized polyvinylchloride pellets (same as in example 1) were melt extruded into an undulating rib structure like that of FIG. 19 using an extrusion die having the following configuration:

| Rib width | 0.76 mm |
|---|---|
| Rib base | 0.46 mm |
| Rib height | 5.25 mm |
| Rib spacing | 5.08 mm |
| Backing slot | 0.46 mm |
| Wave height | 4.52 mm |
| Wave radius | 1.22 mm |
| No. of ribs | 11 |

Extrusion temperatures were in the 150° C. to 165° C. range. The resulting web was quenched in a water bath at 46 mm/second. The basic weight was 3.0 kg/sq. meter. The water level was approximately 25 mm from the face of the die. A 30 mm extruder was used.

EXAMPLE 3

Plasticized polyvinylchloride pellets (same as in Example 1) were melt extruded into an undulating rib structure like that of FIG. 15 using an extrusion die having the following configuration:

| Rib width | 1.27 mm |
|---|---|
| Rib base | 0.152 mm |
| Rib height | 0.35 mm |
| Rib orientation | 90° |
| Rib separation | 4.72 mm |

Extrusion temperatures were in the 150° C. to 165° C. range. The resulting structure was quenched in a water bath at 56 mm/second. The basic weight was 0.013 kg/sq. meter The water level was approximately 51 mm from the face of the die. A 30 mm extruder was used.

EXAMPLE 4

Commercially available licorice was melt extruded into an undulating rib structure like that of FIG. 8 using an extrusion die having the following configuration:

| Undulating rib width | 1.12 mm |
|---|---|
| Undulating rib base | 0.46 mm |
| Undulating rib height | 4.6 mm |
| Undulating rib spacing | 6.35 mm |
| Static rib width | 0.46 mm |
| Static rib height | 4.6 mm |
| No. of static ribs | 5 |
| No. of undulating ribs | 6 |

Extrusion temperatures were in the 50° C. to 60° C. range. The resulting web was air quenched at 1.6 mm/second. The basic weight was 2.96 kg/sq. meter. A 30 mm extruder was used.

What is claimed is:

1. A process for making an extruded article comprising:
   (a) extruding an extrudable plastic mass having a conformable state and being convertible to a cured state to form an elongate extruded structure having a base element and a plurality of elongate rib elements, said rib elements each having an attachment end and a free end with the attachment end in contact with said base element along its entire length, said rib elements being thicker at said free ends than at said attachment ends, the extrusion rate of said base element and said attachment ends of said rib elements being the same but being sufficiently slower than the extrusion rate of said free ends of said rib elements so that said free ends of said rib elements will undulate as said extruded structure is extruded;
   (b) permitting said free ends of said rib elements to undulate without distortion of said base element while said plastic mass is in said conformable state; and
   (c) converting said plastic mass from said conformable state to said cured state while maintaining the undulations in said free ends of said rib elements.

2. A process for making an extruded article comprising:
   (a) extruding an extrudable plastic mass having a conformable state and being convertible to a nonconformable state to form an elongate extruded structure having a base element having opposite side edges and first and second surfaces and a plurality of elongate rib elements, said rib elements each having an attachment end and a free end with the attachment end in contact with said first or second surface along its entire surface, said rib elements being thicker at said free ends than at said attachment ends, the extrusion rate of said base element and said attachment ends of said rib elements being the same but being sufficiently slower than the extrusion rate of said free ends of said rib elements so that said free ends of said rib elements will undulate as said extruded structure is extruded;
   (b) permitting said free ends of said rib elements to undulate without distortion of said base element while said plastic mass is in said conformable state; and
   (c) converting said plastic mass from said conformable state to said nonconformable state while maintaining the undulations in said free ends of said rib elements.

3. The process of claim 1 wherein said extrudable plastic mass is a thermoplastic material.

4. The process of claim 1 wherein said base element is formed of a first extrudable plastic mass and said plurality of plastic rib elements is formed of a second extrudable plastic mass.

5. The process of claim 1 wherein said base element is non-planar.

6. The process of claim 1 wherein said base element is planar.

7. The process of claim 1 wherein said extrusion is by use of an extrusion die with a rib orifice having a $W_t$ to $W_b$ ratio greater than 1.1.

8. The process of claim 1 wherein said extrusion is by use of an extrusion die with a rib orifice having a rib height to rib base thickness ratio of at least 3.

* * * * *